Patented Dec. 7, 1943

2,336,275

UNITED STATES PATENT OFFICE 2,336,275

AZO DYE COMPOUND

James G. McNally and Joseph B. Dickey, Rochester, N. Y., assignors to Eastman Kodak Company, Rochester, N. Y., a corporation of New Jersey No Drawing. Application October 10, 1940, Serial No. 360,626

4 Claims. (Cl. 260—199)

This invention relates to new azo dye compounds and their application to the art of coloring.

We have discovered that the azo compounds selected from the group consisting of azo compounds having the general formulae:

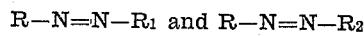

wherein R represents the residue of a member selected from the group consisting of an aryl nucleus of the benzene series, an aryl nucleus of the naphthalene series, a benzoxazole nucleus and a benzothiazole nucleus, $R_1$ represents the residue of a benzene nucleus, $R_2$ represents the residue of a naphthalene nucleus and wherein the nuclei $R_1$ and $R_2$ each contains a

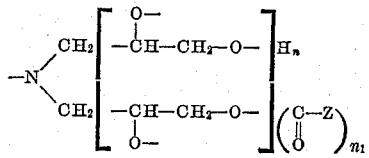

grouping, wherein Z represents a member selected from the group consisting of hydrogen, an alkyl, a carboxyalkyl, an alkenyl, a carboxyalkenyl, a phenyl, a naphthyl, a cycloalkyl and a furyl group, $n$ stands for 0, 1, 2 or 3 and $n_1$ stands for 1, 2, 3 or 4, in para position to the azo bond, constitute a valuable class of dye compounds. Depending upon their structure, the azo compounds of our invention possess application for the coloration of organic derivatives of cellulose, silk and wool. Coloration can be effected by dyeing, printing, stenciling or like methods.

While our invention relates broadly to azo compounds having the formulae given above, it relates more particularly to those compounds wherein R is a benzene nucleus and Z is alkyl or furyl.

Both sulfonated and non-sulfonated compounds are included within the scope of our invention. The nuclear non-sulfonated compounds have been found to be especially of value for the dyeing of organic derivatives of cellulose and it is to these compounds and their application for the dyeing of organic derivatives of cellulose that our invention is particularly directed. The nuclear non-sulfonated compounds likewise possess some application for the dyeing of wool and silk. For the dyeing of organic derivatives of cellulose, such as cellulose acetate silk, nuclear non-sulfonated dye compounds wherein R is a benzene nucleus are generally advantageous.

The nuclear sulfonated compounds of our invention have little or no utility for the dyeing of organic derivatives of cellulose but possess application for the dyeing of wool and silk. Preferably when the dye compounds of our invention are to be employed for the dyeing of organic derivatives of cellulose, they should contain no nuclear free carboxylic acid group. Red, yellow, orange-yellow, orange-red, greenish-blue, blue and violet dyeings, for example, can be obtained employing the dye compounds of our invention.

It is an object of our invention to provide a new class of azo dye compounds suitable for the coloration of organic derivatives of cellulose, wool and silk. Another object of our invention is to provide a process for the coloration of organic derivatives of cellulose, wool and silk. A further object is to provide colored textile materials which are of good fastness to light and washing. A particular object of our invention is to provide a new class of nuclear non-sulfonated azo dyes suitable for the coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate silk, a material to which the invention is especially adapted, it will be understood that it applies to the coloration of other organic derivatives of cellulose such as those just named as well as to the coloration of wool and silk.

The azo dye compounds of our invention can be prepared by diazotizing diazotizable members selected from the group consisting of an arylamine of the benzene series, an aminonaphthalene, an aminobenzothiazole and an aminobenzoxazole and coupling the diazonium compounds obtained with a benzene or naphthalene nucleus containing a

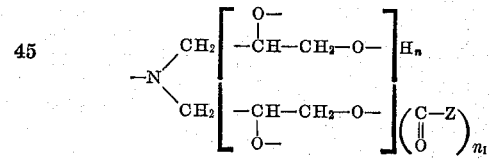

grouping, wherein Z, $n$ and $n_1$ have the meaning previously assigned to them, said benzene or naphthalene nucleus containing no substituent which would prevent coupling and being adapted to couple in para position to the grouping just described.

It will be understood that the term "a furyl group" as used herein and in the claims includes furyl radicals such as furfuryl, tetrahydrofurfuryl, 5-ethylfurfuryl and 5-β-hydroxyethyltetrahydrofurfuryl. Similarly, the term "alkenyl"

refers to a univalent hydrocarbon radical containing a double bond.

The nuclei represented by R, $R_1$ and $R_2$ can be substituted or unsubstituted. These nuclei can be substituted, for example, with the substituent groups customarily appearing on such nuclei. As is understood in the art, these nuclei can be substituted with substituents such as a nitro group, a halogen atom, an alkyl group, an alkoxy group, a hydroxy group, a cyano group, a sulfonic acid group, a carboxylic acid group and an acyl group. The substituents named are intended to be illustrative and not limitative of those that may be substituted on the nuclei in question.

The following examples illustrate the preparation of the azo dye compounds of our invention:

Example 1

12.8 grams of o-chloroaniline are dissolved in 150 cc. of water to which has been added 25 cc. of 36% hydrochloric acid. The resulting solution is cooled to a temperature approximating 0–5° C. and the o-chloroaniline is diazotized while maintaining a temperature of 0–5° C. by adding, with stirring, 6.9 grams of sodium nitrite dissolved in water.

18.3 grams of diglycerylaniline acetate are dissolved in water containing 11 cc. of 36% hydrochloric acid and the resulting solution is cooled to a temperature of 0–10° C. The diazonium solution prepared above is then added dropwise with stirring while maintaining the reaction mixture in a cooled condition. Concurrently with the addition of the diazonium solution, an aqueous solution of sodium acetate is added at a rate sufficient to maintain the reaction mixture just acid to Congo red paper. After complete addition of the diazonium solution, the reaction mixture is permitted to stand for a short time following which sufficient sodium acetate is added to make it neutral to Congo red paper. Upon completion of the coupling reaction which takes place, the desired dye compound formed is recovered by filtration, washed with water and dried. The dye compound obtained colors cellulose acetate silk, wool and silk yellow.

By the substitution of an equivalent gram molecular weight of diglycerylaniline (furoate, benzoate or naphthenate) for the coupling component of the example, dye compounds are obtained which similarly color cellulose acetate silk, wool and silk yellow.

Example 2

13.5 grams of p-aminoacetophenone are diazotized in known fashion and the diazonium compound obtained is coupled with 21.3 grams of diglycerylaniline diacetate. Coupling and recovery of the dye compound formed can be carried out in accordance with the general procedure described in Example 1. The dye compound obtained colors cellulose acetate silk, wool and silk orange-yellow.

By the substitution of an equivalent gram molecular weight of diglycerylaniline diformate, for the coupling component of the example, a dye compound is obtained which similarly colors the materials above named orange-yellow.

Example 3

13.3 grams of p-nitroaniline are diazotized and the diazonium compound obtained is coupled with 24.3 grams of diglycerylaniline triacetate. The dye compound obtained colors cellulose acetate silk red.

Example 4

17.3 grams of 1-amino-2-chloro-4-nitrobenzene are diazotized and the diazonium compound obtained is coupled with 27.3 grams of diglycerylaniline tetraacetate. The dye compound obtained colors cellulose acetate silk, wool and silk rubine.

Example 5

21.7 grams of 1-amino-2-bromo-4-nitrobenzene are diazotized and the diazonium compound obtained is coupled with an equivalent gram molecular weight of diglyceryl-m-toluidine-diacetatepropionate. The dye compound obtained colors cellulose acetate silk, wool and silk rubine.

Example 6

16.8 grams of 1-amino-2-methoxy-4-nitrobenzene are diazotized and the diazonium compound obtained is coupled with .1 gram mole of m-chlorodiglycerylaniline tripropionate. The dye compound obtained colors cellulose acetate silk, wool and silk orange.

Example 7

25.6 grams of p-nitrobenzeneazo-m-toluidine are diazotized and the diazonium compound obtained is coupled with .1 gram mole of 5-hydroxydiglycerylamino-α-naphthalene tetraacetate. The dye compound obtained colors cellulose acetate silk red.

Example 8

.1 gram molecular weight of p-nitroaniline is diazotized and the diazonium compound obtained is coupled with .1 gram molecular weight of 5-hydroxyethylamino-α-diglycerylaminonaphthalene triacetate. The dye compound obtained colors cellulose acetate silk blue.

Example 9

18.3 grams of 1-amino-2,4-dinitrobenzene are diazotized and the diazonium compound obtained is coupled with .1 gram molecular weight of 5-hydroxy-α-diglycerylaminonaphthalene dipropionate. The dye compound obtained colors cellulose acetate silk blue.

Example 10

.1 gram molecular weight of o-chloroaniline is diazotized and the diazonium compound obtained is coupled with .1 gram molecular weight of diglycerylamino-α-naphthalene triacetate propionate. The dye compound obtained colors cellulose acetate silk orange-yellow.

Example 11

21.8 grams of 1-amino-2,4-dinitro-6-chlorobenzene are diazotized and the diazonium compound obtained is coupled with .1 gram molecular weight of diglyceryl cresidine tetraacetate. The dye compound obtained colors cellulose acetate, wool and silk reddish-blue.

Example 12

The diazonium solution of Example 11 is coupled with .1 gram molecular weight of diglycerylamino-α-naphthalene tetraacetate. The dye compound obtained colors cellulose acetate silk blue.

Example 13

26.2 grams of 1-amino-2,4-dinitro-6-bromobenbene are diazotized and the diazonium compound obtained is coupled with .1 gram molecular weight of 2,5-dimethoxydiglycerylaniline tetraacetate. The dye compound obtained colors cellulose acetate silk, wool and silk reddish-blue.

Example 14

52 grams of

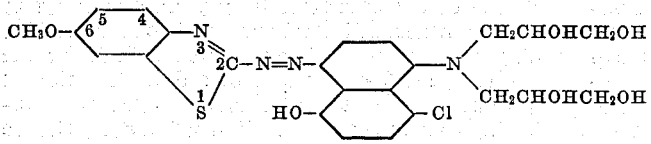

are dissolved in glacial acetic acid, warmed to 50° C. and 41 grams of acetic anhydride dissolved in glacial acetic acid are added dropwise with stirring. Stirring is continued for several hours after which water is added and the desired dye compound is recovered by filtration, washed with water and dried. By the reaction just described the hydroxyl groups of the glyceryl radicals are each converted to the acetate radical. The dye compound of this example colors cellulose acetate silk blue.

Example 15

49.2 grams of

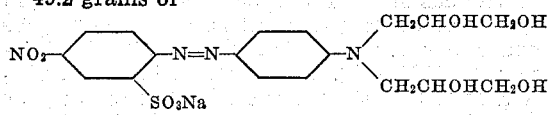

are dissolved in glacial acetic acid and heated to 50° C. together with 20 grams of sodium acetate. 56 grams of palmityl chloride dissolved in glacial acetic acid are then added dropwise with stirring and stirring and heating are continued until no further precipitate of sodium chloride is formed. The reaction mixture is then cooled, water is added, and the dye compound formed recovered by filtration, washed with water and dried. By the reaction which takes place, two hydroxyl groups of the glyceryl radicals are converted to their palmitate form. The dye compound of this example colors wool and silk red.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure indicated hereinbefore.

| Amine | Coupling component | Color |
|---|---|---|
| o-Chloroaniline | 1. Diglyceryl-m-chloroaniline butyrate | Yellow. |
| Do | 2. Diglyceryl-m-chloroaniline diacetate | Do. |
| Do | 3. Diglyceryl-2-methoxy-5-chloroaniline acetate | Do. |
| Do | 4. Diglyceryl-2-ethoxy-5-bromoaniline diacetate propionate | Do. |
| Do | 5. Diglyceryl-2-methoxy-5-chloro-aniline tetraacetate | Do. |
| Do | 6. Diglycerylaniline crotonate | Do. |
| Do | 7. Diglycerylaniline furoate | Do. |
| Do | 8. Diglycerylaniline stearate | Do. |
| Do | 9. Diglycerylaniline naphthenate | Do. |
| Do | 10. Diglycerylaniline benzoate | Do. |
| Do | 11. Diglyceryl-m-toluidine tripropionate | Do. |
| Do | 12. Diglyceryl-m-toluidine dipropionate palmitate | Do. |
| Do | 13. Diglyceryl-m-anisidine tetraacetate | Do. |
| Do | 14. Diglycerylcresidine laurate | Do. |
| Do | 15. Diglycerylcresidine tetraacetate | Do. |
| Do | 16. Diglyceryl-2,5-dimethoxyaniline triacetate propionate | Do. |
| Do | 17. Diglyceryl-2,5-dipropoxyaniline diacetate | Do. |
| Do | 18. Diglyceryl-m-chloroaniline acid succinate | Do. |
| Do | 19. Diglycerylaniline acid malonate | Do. |
| Do | 20. Diglycerylcresidine acid maleate | Do. |
| Do | 21. Diglyceryl-m-toluidine acetate acid succinate | Do. |
| Do | 21a. Diglyceryl-n-toluidine acetate methoxyacetate | Do. |
| 1-amino-2-(F,Cl,Br,I)-4-methylbenzene | Coupling components 1–21a | Do. |
| 1-amino-2-methoxy-5-(F,Cl,Br,I)-benzene | do | Do. |
| Methylanthranilate | do | Orange-yellow to orange. |
| p-Aminobenzamide | do | Do. |
| p-Aminobenzenesulfonamide | do | Do. |
| p-Aminoacetophenone | do | Orange. |
| 1-amino-3-nitro-4-chlorobenzene | do | Do. |
| 1-amino-3-nitro-4-ethylbenzene | do | Do. |
| 1-amino-3-nitro-4-methoxybenzene | do | Do. |
| 1-amino-2-nitro-4-chlorobenzene | do | Orange to red. |
| p-Nitroaniline | do | Orange to rubine. |
| 1-amino-2-(F,Cl,Br,I)-4-nitrobenzene | do | Red to violet. |
| 1-amino-2,4-dinitro-6-(F,Cl,Br,I)-benzene | do | Red violet to blue. |
| 1-amino-2,4,6-trinitrobenzene | do | Red to blue. |
| 2-amino-6-methoxy-benzothiazole | do | Red to rubine. |
| 2-amino-6-methoxy-benzoxazole | do | Do. |
| α-naphthylamine | do | Red to blue. |
| 1-amino-2,4-dinitrobenzene | 22. Diglycerylamino-α-naphthalene acetate | Violet. |
| Do | 23. Diglycerylamino-α-naphthalene diacetate | Do. |
| Do | 24. Diglycerylamino-α-naphthalene stearate | Do. |
| Do | 25. 2-methyl-1-diglycerylaminonaphthalene tetracrotonate | Do. |
| Do | 26. 2-ethyl-1-diglycerylnaphthalene tetrapropionate | Do. |
| Do | 27. Diglycerylamino-α-naphthalene di-acid succinate | Do. |
| 1-amino-2,4-dinitro-6-(F,Cl,Br,I)-benzene | Coupling components 22–27 | Blue. |
| 2,4-dinitro-α-naphthylamine | do | Do. |
| 2,4,6-trinitroaniline | do | Green. |
| 2-amino-5-nitro-phenylmethylsulfone | do | Purple. |
| 2-amino-6-ethoxybenzothiazole | do | Red. |
| p-Nitroaniline | 28. 5-hydroxy-1-diglycerylaminonaphthalene acetate | Blue. |
| Do | 29. 5-hydroxy-1-diglycerylamino naphthalene diacetate | Do. |
| Do | 30. 5-hydroxy-1-diglycerylaminonaphthalene dipropionate | Do. |
| Do | 31. 5-hydroxy-1-diglycerylaminonaphthalene benzoate | Do. |
| Do | 32. 5-hydroxy-1-diglycerylaminonaphthalene naphthenate | Do. |
| Do | 33. 5-methoxy-1-diglyceryl-aminonaphthalene diacid maleate | Do. |
| Do | 34. 5-ethoxy-1-diglycerylamino-naphthalene diacid malonate | Do. |
| 1-amino-2-methoxy-4-nitrobenzene | Coupling components 28–34 | Do. |
| 1-amino-2-(F,Cl,Br,I)-4-nitrobenzene | do | Do. |
| 2-amino-5-nitromethyl-benzoate | do | Do. |
| 5-nitro-2-aminophenyl-methylsulfone | do | Greenish-blue. |
| p-nitrobenzeneazo-m-toluidine | do | Blue. |
| p-nitrobenzeneazo-m-anisidine | do | Do. |
| p-nitrobenzeneazo-cresidine | do | Do. |
| 1-amino-2, 4-dinitro-6-(F,Cl,Br,I)-benzene | do | Blue-green. |
| 2-amino-6-ethoxybenzoxazole | do | Blue. |

While our invention has been described more particularly in connection with unsulfonated compounds, it will be understood that sulfonated compounds are included within the scope of our invention. Sulfonated aromatic amines that can be diazotized and the diazonium compounds resulting coupled with the coupling components of our invention to give dye compounds which color wool and silk include, for example, p-sulfanilic acid, 1-amino-4-sulfonic naphthalene, 2-naphthylamine-8-sulfonic acid, 1-naphthylamine-3-sulfonic acid, 1-naphthylamine-5-sulfonic acid, 1-naphthylamine-6-sulfonic acid, 1-naphthylamine-4,8-disulfonic acid, 1-naphthylamine-3,8-disulfonic acid, 1-amino-5-naphthol-7-sulfonic acid, metanilic acid, 1-amino-2-sulfonic-4-nitrobenzene, 1-amino-2,4-disulfonic benzene and 1-amino-2-chloro-4-sulfonic benzene. To illustrate, p-sulfanilic acid can be diazotized and the diazonium compound obtained coupled with diglyceryl-m-chloroaniline diacetate, di-glycerylamino-α-naphthalene di-acid succinate and 5-hydroxy-1-diglycerylaminonaphthalene dipropionate to obtain dye compounds which color wool and silk red to blue.

The manner of introducing the acyl ester group or groups into the compounds of our invention is illustrated in Examples 14 and 15. The reactions there described, although described in connection with azo dyes, are equally applicable for the introduction of one or more acyl ester groups into a benzene or naphthalene coupling component containing a diglycerylamino grouping. One or more acyl ester groups can be present in the compounds of our invention. Where more than one acyl ester group is present, the acyl ester groups may be the same or different. Thus, diglyceryl aniline can be treated to first introduce an acetate group, further treated to introduce another acyl ester group such as a propionate group and still further treated to introduce a third acyl ester group such as the benzoate group. As the acylation reaction can be carried out in known manner and as the acylation agents employed are known, it is not believed necessary to further discuss the manner of introducing acyl ester groups into the compounds of our invention.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivative of cellulose textile materials from an aqueous solution of the dye which may contain salt. For a more complete description as to how the azo dye compounds of our invention may be employed, in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compound having the formula:

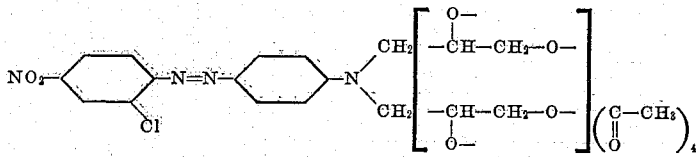

2. An azo dye compound having the formula:

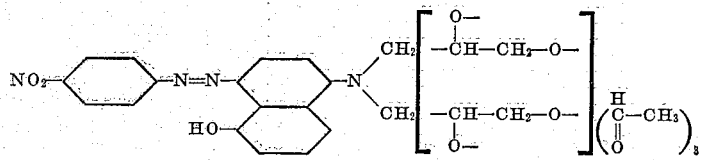

3. The azo dye compound having the formula:

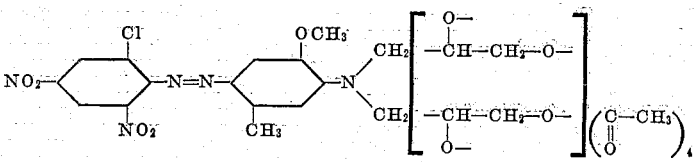

4. The azo dye compounds having the formula:

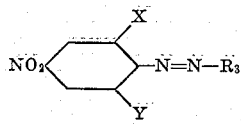

wherein X represents a member selected from the group consisting of hydrogen and chlorine, Y represents a member selected from the group consisting of hydrogen and a nitro group, and $R_3$ represents the residue of a member selected from the group consisting of diglycerylaniline tetraacetate, diglyceryl-2-methoxy-5-methylaniline tetraacetate and 5-hydroxy-1-diglycerylaminonaphthalene triacetate.

JAMES G. McNALLY.
JOSEPH B. DICKEY.